(12) United States Patent
Oppenheimer et al.

(10) Patent No.: US 8,896,451 B2
(45) Date of Patent: Nov. 25, 2014

(54) BEETLE SENSING DEVICE AND METHOD OF USE

(75) Inventors: Charles Hugh Oppenheimer, Lake Oswego, OR (US); Robert Lawrence Heberling, Camas, WA (US)

(73) Assignee: Plurasense, Inc., Lake Oswego, OR (US)

( * ) Notice: Subject to any disclaimer, the term of this patent is extended or adjusted under 35 U.S.C. 154(b) by 548 days.

(21) Appl. No.: 13/336,365

(22) Filed: Dec. 23, 2011

(65) Prior Publication Data

US 2013/0162443 A1 Jun. 27, 2013

(51) Int. Cl.
*G08B 23/00* (2006.01)

(52) U.S. Cl.
USPC ............. 340/573.2; 340/573.1; 340/540

(58) Field of Classification Search
CPC combination set(s) only.
See application file for complete search history.

(56) References Cited

U.S. PATENT DOCUMENTS

| 1,941,659 | A | * | 1/1934 | Coleman | 43/122 |
| 2,020,283 | A | * | 11/1935 | Armstrong et al. | 43/107 |
| 3,108,391 | A | * | 10/1963 | Sipos | 43/113 |
| 4,316,344 | A | * | 2/1982 | Carlsen | 43/114 |
| 4,471,563 | A | * | 9/1984 | Lindgren | 43/122 |
| 5,646,404 | A | * | 7/1997 | Litzkow et al. | 250/338.1 |
| 6,766,251 | B2 | | 7/2004 | Mafra-Neto et al. | |
| 6,822,279 | B2 | | 11/2004 | Shuman et al. | |

* cited by examiner

*Primary Examiner* — Travis Hunnings
(74) *Attorney, Agent, or Firm* — Bruce E Harang

(57) ABSTRACT

Improved beam-interruption type pest detection devices adaptable to mounting on known pest traps utilizing a focused reflective optical sensor providing reduced clogging risk, increased sensitivity, increased sensing consistency and reduced energy consumption, and which can be electronically networked providing improved pest detection, analysis, and management.

19 Claims, 6 Drawing Sheets

BEETLE SENSING DEVICE AND METHOD OF USE

BACKGROUND OF THE INVENTION

1. Field of the Invention

The present invention generally relates to a pest monitoring device and method of sensing said pests arriving in traps set for the purpose of beetle monitoring. More particularly the present invention relates to a beetle sensing device providing greater sensitivity, greater sensing consistency, and reduced clogging risk as well as means of remotely recording data from both individual sensing devices and a plurality of said devices connected via a network.

2. Description of the Related Art

Pest monitoring is an established management tool to help protection crops, forests, and gardens against damage done by various pests including for example, beetles. Several beetle species which are pests of concern include the Bark beetles that attack conifers. Damage to, and death of, these conifers is done by these beetles burrowing in their bark. Particularly susceptible to attack are stressed trees. In the western U.S. and Canada conifers are presently under severe attack by the mountain pine beetle.

Ambrosia beetles feed on wood in various forms, including for example, live fruit and nut trees as well as on seasoning logs and/or lumber leaving pinholes which reduce the value of the lumber. As such they pose an economic threat to lumberyards.

The Japanese beetle is a truly vexing pest. The larvae feed on a broad variety of roots and the adults feed on the leaves of more than 250 important plants such as turf grasses, crops, ornamental plants, and vegetables. They presently infest the U.S. east of the Mississippi River. In addition, the risk of additional invasive beetle pest arrival is increasing as international commerce increases.

In response to such pest threats pest traps are used for manual monitoring of pest movement and population. Beetle traps are well known as a management tool to combat pest damage to agricultural, horticultural, forest and lumber resources. For example, U.S. Pat. No. 4,471,563 issued Sep. 18, 1984 to Lindgren teaches a trap for catching bark beetles and ambrosia beetles. Likewise, U.S. Pat. No. 2,020,283 issued May 10, 1935 to Armstrong et al teaches a trap for Japanese beetles.

More recently there have been efforts to automate the monitoring of pest traps including beetle traps as well as providing the ability to network a desired number of traps allowing for automated management of a plurality of traps connected into a single network. For example, U.S. Pat. No. 5,646,404 issued Jul. 8, 1997 to Litzkow et al, teaches a wired network monitoring system for a plurality of pest traps used in stored products. The traps in this teaching utilize light beam interruption for insects infesting stored grain products.

Similarly, U.S. Pat. No. 6,882,279 issued Apr. 19, 2005 to Shuman, et al, teaches the use of a wireless network monitoring system for a plurality of pest traps used in stored products using variously directed multiple beams to size the trapped insects.

U.S. Pat. No. 6,766,251 issued Jul. 20, 2004 to Mafra-Neto, et al, teaches a wireless network monitoring system for a plurality of pest traps to monitor arbitrary agricultural pests using arbitrary sensors.

All of these related art references utilize transmissive optical sensing having sensing passageways for falling pests between an LED emitter and a photo detector sensor which is located near the boundaries of, and horizontally and diametrically opposed across a section of the passageway. An arriving pest breaks a beam radiated by the emitter, casting a shadow upon the photo-detector sensor. Relative to the unobstructed no pest condition, the change in radiation incident upon the photo-detector sensor due to shadowing by the pest governs sensitivity to pest arrivals. Optical spreading between the emitter, the sensor, and the pest determines the difference in incident radiation between unobstructed and shadowed conditions, and sensitivity depends on pest location within the passageway section. The passageway section is sized to be just larger than the pest to maximize sensitivity and to minimize sensitivity variations from pest location within the passageway.

One limitation of devices utilizing transmissive optics is that they are susceptible to clogging and therefore poorly suited to outdoor applications in which debris and predators are likely to enter and clog the narrow passageways, thereby preventing sensing of subsequently arriving pests. Additionally clogging necessitates the manual clearing of the device to recover monitoring function. The labor of visiting monitoring devices for clog removal greatly reduces the value and application of automated remote pest monitoring. In these related art references increasing the passageway size is the means of preventing such clogging. However passageway enlargement introduces at least two undesirable results. First system sensitivity decreases because of the increased optical spreading over increased distances between the emitter and the sensor, and second variation of sensor response increases with the increased extent of possible pest locations within the passageway section. While in the first case system sensitivity can be recovered to some extent with a more energetic emitter or a larger sensor, these approaches increase both component costs and energy consumption. However in applications where line power is unavailable, and energy must be provided by batteries, increasing the energy demand limits the use and usability of remote pest sensing devices. The latter issue of inconsistent sensitivity complicates definition of the pest arrival threshold, which must be established and embedded in system electronics, by reducing the repeatability and reliability of pest sensing.

The compromise required in these teachings between sensitivity, sensing zone size, and sensing uniformity is undesirable because an accurate and useful beetle monitor would optimize all three attributes. However, in these teachings increased sensitivity may only be attained at the expense of reducing sensing zone size along with undesirably increased clogging risk. Conversely, the approach of an increased sensing zone size to reduce clogging risk comes with the undesirable cost of reduced sensitivity and sensing consistency; a more energetic emitter or enlarged sensor mitigates these disadvantages to some degree but incurs increased component costs and energy consumption, both of which are undesirable especially for field applications without line power.

Thus, there remains a need for a cost effective pest monitor with high sensitivity, sensing consistency and minimized clogging risk along with low power consumption allowing the practicable use of remote battery powered pest sensors and sensor networks.

DISCLOSURE OF THE INVENTION

The present invention provides advantages and alternatives over the prior art by providing a pest trap sensor providing both a reflective sensor with emitter and sensor elements, side by side, in a single package, and a concave mirror mounted on one side of the pest passageway opposite to and at a distance of two focal lengths from the reflective sensor.

According to a further aspect of the present invention, there is provided a pest trap sensor having improved energy efficiency allowing for more effective use of battery power.

According to yet another aspect of the present invention there is provided a pest trap sensor that prevents sensor clogging by debris or pest predators.

According to a yet further aspect of the present invention there is provided a pest trap sensor which is suitable for use with well known pest traps such as U.S. Pat. No. 4,471,563 issued Sep. 18, 1984 to Lindgren, and herein incorporated by reference, for catching bark beetles and ambrosia beetles as well as that of U.S. Pat. No. 2,020,283 issued May 10, 1935 to Armstrong et al, and herein incorporated by reference, for catching Japanese beetles.

According to still another aspect of the present invention is a pest trap sensor which relaxes the compromise between sensitivity and sensing consistency thereby providing greater reliability and repeatability of sensing.

According to still yet another aspect of the present invention provides a pest trap sensor suitable for use as a node in a wired or wireless network of a plurality of the same and/or different pest trap sensors and which is capable of logging pest arrival times and providing automatic alarms based on pest arrival counts.

According to a still another aspect of the present invention is an improved beam-interruption type pest detection sensor assembly suitable for use with known pest traps in which pests are deflected downward and fall by gravity comprising in cooperative combination: a mesh screen assembly comprising; a funnel having a wider diameter first end connectable to the output end of a pest trap, a narrower second end adaptable to connecting to a sensor assembly, and having a fixedly mounted mesh screen therein and mountable on; a sensor assembly comprising; a focused reflective concave mirror sensor fixedly mounted within a co-operatively dimensioned sensor container, said focused reflective concave mirror sensor comprising a mounting plate, a concave mirror forming cradle having a concave mirror and a reflective sensor wherein said concave mirror having a focal length f=R/2, the spacing between said reflective sensor and said focused reflective concave mirror is equal to the radius of said mirror producing an image having equal size and opposite orientation on said reflective sensor; and a catch can assembly comprising; a co-operatively dimensioned trapping container having a first end mountable to the exit of said sensor assembly, a second end sealed thereby forming a collection container; thereby creating a beam-interruption pest sensor using focused reflective concave mirror sensor having improved sensitivity, improved sensing consistency, lower energy consumption, and adaptable to mounting on pest traps in which pests are deflected downward and then fall by gravity.

According to a still another aspect of the present invention is an improved beam-interruption type pest detection sensor assembly suitable for use with known pest traps in which pests are deflected downward and fall by gravity comprising in cooperative combination: a mesh screen assembly comprising; a funnel having a wider diameter first end connectable to the output end of a pest trap, a narrower second end adaptable to connecting to a sensor assembly, and having a fixedly mounted mesh screen therein and mountable on; a sensor assembly comprising; a focused reflective concave mirror sensor fixedly mounted within a co-operatively dimensioned sensor container, said focused reflective concave mirror sensor comprising a mounting plate, a concave mirror forming cradle having a concave mirror and a reflective sensor wherein said concave mirror having a focal length f=R/2, the spacing between said reflective sensor and said focused reflective concave mirror is equal to the radius of said mirror producing an image having equal size and opposite orientation on said reflective sensor; and a catch can assembly comprising; a co-operatively dimensioned trapping container having a first end mountable to the exit of said sensor assembly, a second end sealed thereby forming a collection container, further having a suitably located and dimensioned decanting port for allowing decanting of moisture, said decanting port having a mesh screen preventing escape of trapped pests through said decanting port; thereby creating a beam-interruption pest sensor using focused reflective concave mirror sensor having improved sensitivity, improved sensing consistency, lower energy consumption, and adaptable to mounting on pest traps in which pests are deflected downward and then fall by gravity.

According to a still further aspect of the present invention is an improved beam-interruption type pest detection sensor assembly suitable for use with known pest traps comprising in cooperative combination: a mesh screen assembly comprising; a funnel having a wider diameter first end adaptable to the output of a pest trap, a narrower second end adaptable to connecting to a first adapter capable of mounting to a sensor assembly, and having a mesh screen mounted within, said mesh screen being locked in position by said first adapter; a sensor assembly comprising; a co-operatively dimensioned fixedly mounted integral upper fitting having a first end exposed outside a side of said gang box, said upper fitting further having a second end exposed inside said gang box and an integral pest diverter of a desired geometry fixedly mounted therein, said gang box being sized desirably for housing the sensor components and has fixedly mounted on the opposite side of said gang box a fixedly mounted integral lower fitting, and a removably mountable gang box cover. The integral lower fitting having co-operatively dimensioned female threads in the end exposed outside of said gang box connecting said integral lower fitting to a catch can, sensor components comprising a mount plate, a concave mirror forming cradle having a mirror and a reflective sensor wherein said concave mirror has a focal length f=R/2, the spacing between said reflective sensor and said concave mirror is equal to the radius of said mirror producing an image on said reflective sensor such that object and image have equal size and opposite orientation, and optionally an external radio antenna; a catch can assembly comprising; a co-operatively dimensioned threaded first end with male threads connecting to said integral lower fitting and a second end sealed thereby forming a collection container; thereby creating a beam-interruption pest sensor having improved sensitivity, improved sensing consistency, lower energy consumption and adaptable to mounting on known pest traps.

According to still yet further aspect of the present invention is an improved beam-interruption type pest detection sensor assembly suitable for use with known pest traps comprising in cooperative combination: a mesh screen assembly comprising; a funnel having a wider diameter first end adaptable to the output of a pest trap, a narrower second end adaptable to connecting to a first adapter capable of mounting to a sensor assembly, and having a mesh screen mounted within, said mesh screen being locked in position by said first adapter; a sensor assembly comprising; a co-operatively dimensioned fixedly mounted integral upper fitting having a first end exposed outside a side of said gang box, said upper fitting further having a second end exposed inside said gang box and an integral pest diverter of a desired geometry fixedly mounted therein, said gang box being sized desirably for housing the sensor components and has fixedly mounted on the opposite side of said gang box a fixedly mounted integral lower fitting, and a removably mountable gang box cover. The integral lower fitting having co-operatively dimensioned female threads in the end exposed outside of said gang box connecting said integral lower fitting to a catch can, sensor components comprising a mount plate, a concave mirror forming cradle having a mirror and a reflective sensor wherein said concave mirror has a focal length f=R/2, the spacing between said reflective sensor and said concave mirror is equal to the radius of said mirror producing an image on said reflective sensor such that object and image have equal size and opposite orientation, and optionally an external radio antenna; a catch can assembly comprising; a co-operatively dimensioned threaded first end with male threads connecting to said integral lower fitting and a second end sealed thereby forming a collection container; thereby creating a beam-interruption pest sensor having improved sensitivity and lower energy consumption and adaptable to mounting on known pest traps.

The present invention thus advantageously provides a pest trap sensor having lower power consumption, minimized clogging risk, increased sensitivity, and sensing consistency and is suitable for use both in a stand alone or a network node configuration.

DESCRIPTION OF THE PREFERRED
EMBODIMENTS OF THE INVENTION

Figure 1A:
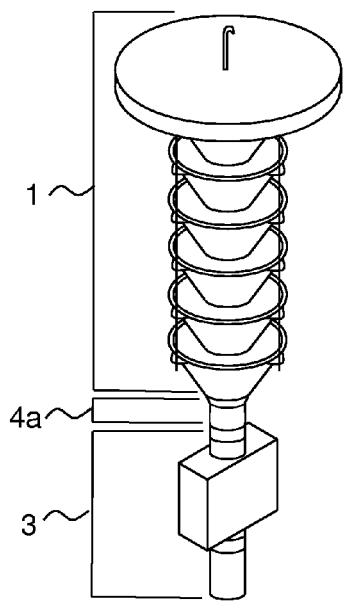
FIG. 1A shows a perspective view of a low debris mesh screen assembly of the present invention and pest sensor of the present invention mounted on a prior art pest trap of Lindgren.
Figure 1B:
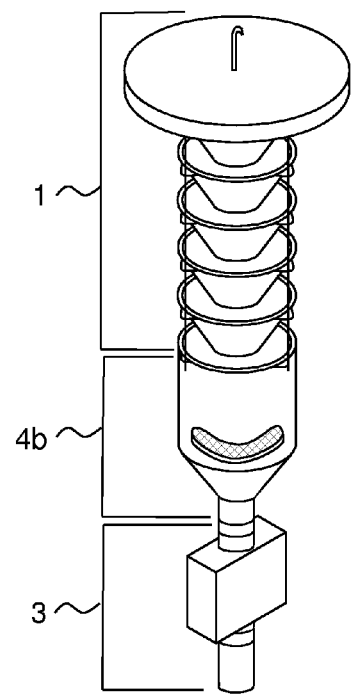
FIG. 1B shows a perspective view of a high debris mesh screen assembly and pest sensor of the present invention mounted on a prior art pest trap of Lindgren.

Reference will now be made to the drawings, wherein to the extent possible like reference numerals are utilized to designate like components throughout the various views. Referring to FIG. 1A, which presents a prior art Lindgren beetle trap 1 having a low debris mesh screen assembly 4a of the present invention and a pest sensor 3 of the present invention mounted thereto at the outfall of said Lindgren beetle trap. Similarly, FIG. 1B, presents a prior art Lindgren beetle trap 1 having a high debris mesh screen assembly 4b and a pest sensor 3 of the present invention mounted thereto at the outfall of said prior art Lindgren beetle trap. The construction and use of the Lindgren beetle trap is taught in U.S. Pat. No. 4,471,563 and herein incorporated by reference.

Figure 2:
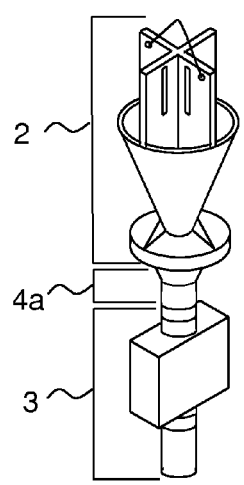
FIG. 2 shows a perspective view of a low debris mesh screen assembly of the present invention and a pest sensor of the present invention mounted on a prior art pest trap of Armstrong et al.

Referring now to FIG. 2 there is shown a prior art Armstrong beetle trap 2 having a high debris mesh screen assembly 4b of the present invention and a pest sensor 3 of the present invention mounted thereto at the outfall of said Armstrong beetle trap. The construction and use of the Armstrong Japanese beetle trap is taught in U.S. Pat. No. 2,020,283 issued May 10, 1985 and herein incorporated by reference. Both the Lindgren and Armstrong et al beetle traps require the use of an attractant to lure flying beetles, which upon attempting to land on the trap slip and fall under gravity, eventually reaching the pest sensor 3 of the present invention. Said pest sensor 3 being fitted to the bottom of a debris mesh screen assembly 4a or 4b which in turn is fitted to the bottom of beetle traps 1 or 2 catches the trapped beetle and as said trapped beetle falls through said sensor 3 is counted, time stamped, and collected.

Figure 3:
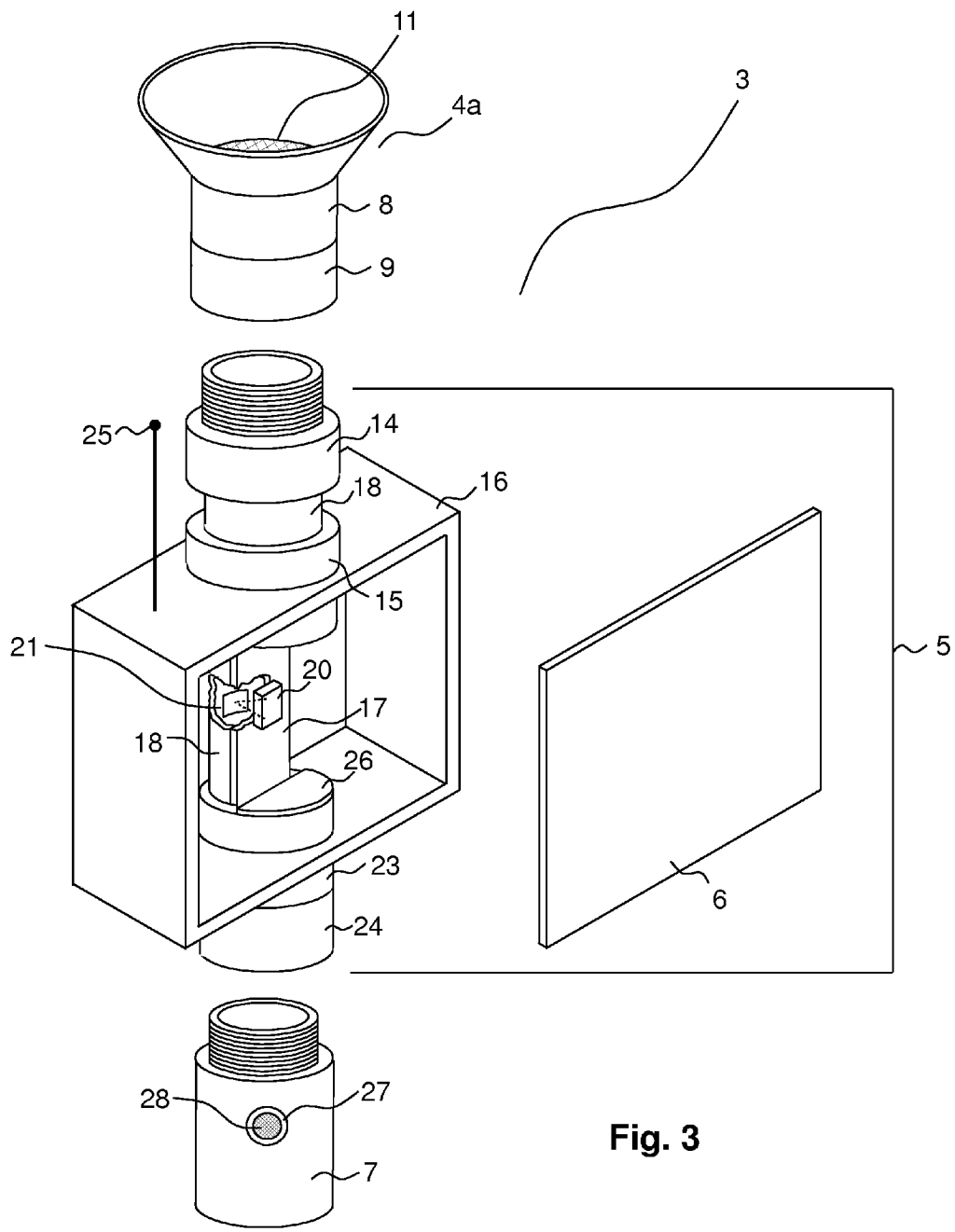
FIG. 3 shows a perspective exploded view of the pest sensor of the present invention.

Referring now to FIG. 3, there is shown an exploded perspective view of sensor 3 comprising generally a mesh screen assembly 4a, a sensor unit assembly 5 and a catch can assembly 7. More particularly, mesh screen assembly 4a comprises a funnel/reducer 8 having a wider diameter end connectively adaptable to the output of a pest trap; a narrower end having co-operatively sized connector adaptable to said throat 9 connecting to said sensor unit assembly 5 and having a mesh screen 11 mounted within said funnel 8, said mesh screen 11 being locked in position by said throat 9. Said sensor unit assembly 5 comprises a co-operatively dimensioned male adapter 14 having a co-operatively connecting first end and a second end fixedly mounted to said sensor unit assembly 5. Said male adapter 14 first end co-operatively connecting with said throat 9, and further co-operatively connecting to box assembly 5 gang box 16 by fixedly mounted upper fitting 15 having a first end exposed outside a side of said gang box 16 through passageway member 18. Said upper fitting 15 further having a second end exposed inside said gang box 16 and an integral pest diverter 10 of a desired geometry fixedly mounted or integrally formed therein. Gang box 16 being sized desirably for housing the sensor components (see FIGS. 6a-6b) of the claimed invention further having fixedly mounted on opposite sides of said gang box 16 a fixedly mounted integral upper fitting 15 and a fixedly mounted integral lower fitting 23 as well as a removably mountable gang box cover 6, said integral lower fitting 23 having a co-operatively sized end exposed outside of the gang box 16, which connects co-operatively through passageway member 18 to female adapter 24 having a co-operatively sized first end and female threads. Finally, said integral lower fitting 23 having a sealing plate 26 for prevention of trapped pest and rainwater migration into said box assembly 5. Also shown are mount plate 17, passageway member 18 having a mirror 21 comprising reflective tape as well as reflective sensor 20 and optional external radio antenna 25. Finally, said catch can 7 comprises a co-operatively dimensioned connectable first end connecting to female adapter 24 and a second end sealed thereby forming a collection container. Said catch can 7 preferably having a decanting port 27 in which a screen 28 is mounted allowing for removal of excess rainwater without permitting escape of trapped pests or ethylene glycol beetle euthanizing agent because of its higher density than water.

Figure 4A:
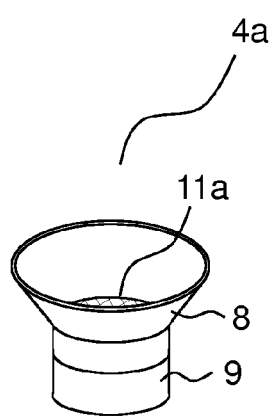
FIG. 4A shows a perspective view of the low debris mesh screen assembly of the present invention.

Referring further to FIG. 4A, there is shown a perspective view of low debris mesh screen assembly 4a suitable for mounting to an Armstrong et al pest trap comprising a mesh screen 11*a* having a desired screen mesh size mounted within said funnel 8, said mesh screen 11*a* being locked in position by said throat 9. Said funnel 8 further defined as being dimensioned on its said wider diameter end allowing co-operative mounting to an Armstrong et al pest trap.

Figure 4B:
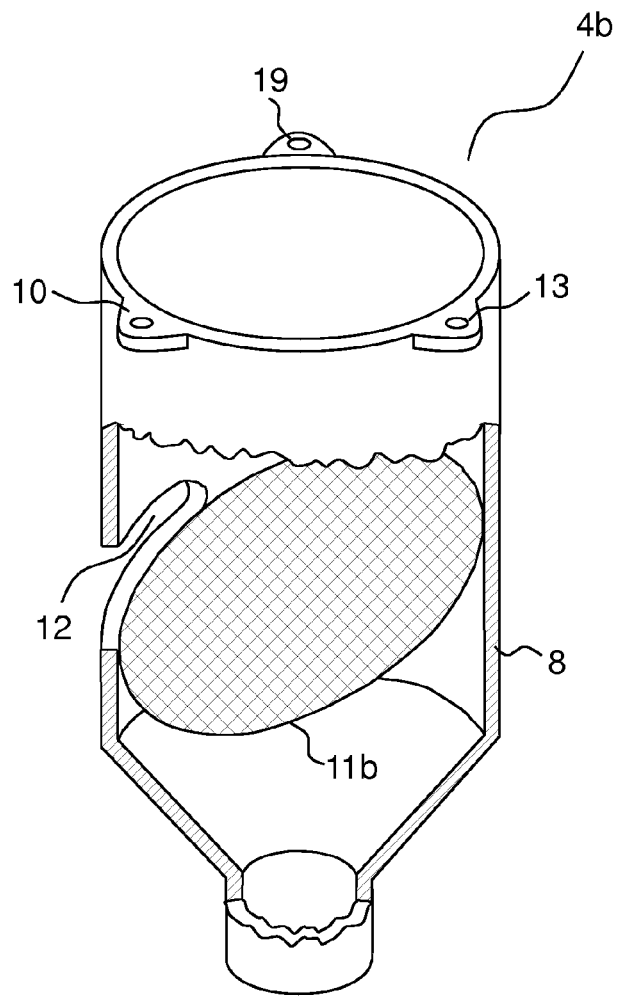
FIG. 4B shows a perspective view of the high debris mesh screen assembly of the present invention.

Similarly, referring to FIG. 4B there is shown a perspective view of a high debris mesh screen assembly 4*b* suitable for mounting to a Lindgren beetle pest trap comprising a mesh screen 11*b* having a desired screen mesh size mounted within said funnel 8, said mesh screen 11*b* being fixedly mounted in position and further mounted to allow collected debris to exit said high debris mesh screen assembly 4*b* by way of opening 12 located within the sidewall of said funnel 8. The presently preferred angle of said mesh screen 11*b* is from about 40 degrees to about 50 degrees. Said funnel 8 further defined as having a plurality of mounting flanges 10 located on said funnel 8 wider diameter end and each said plurality of mounting flanges having located therein a bore 13 of desired dimension. The number and location of said mounting flanges 10 and dimensions of said bores 13 configured to allow co-operative mounting of said high debris mesh screen assembly 4*b* to a Lindgren beetle pest trap.

Figure 5A:
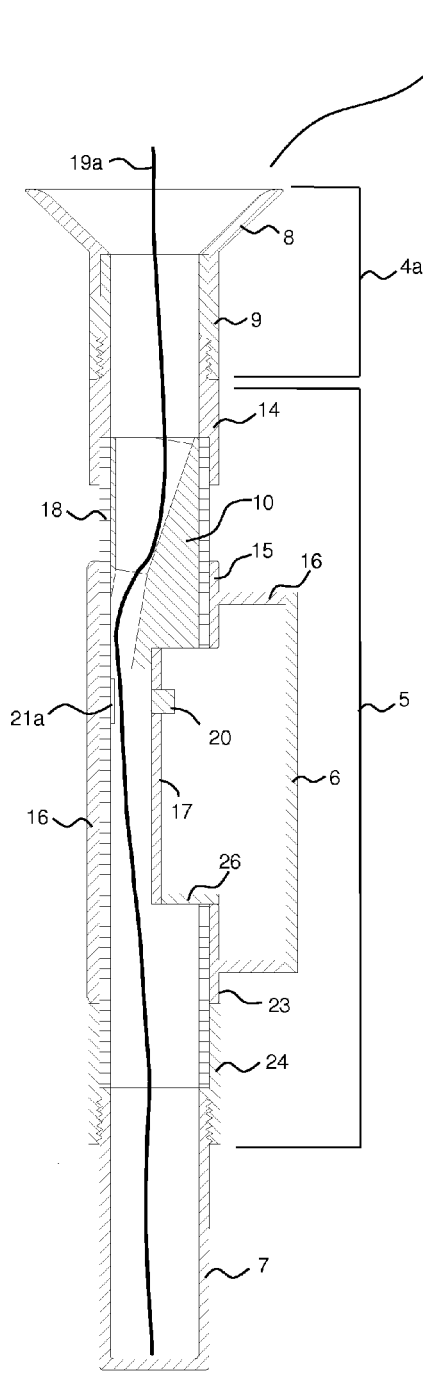
FIG. 5A shows a side sectional view of the cylindrical concave reflector of the present invention as well as the path of entering pests.

Turning now to FIG. 5A, there is shown a cross-sectional view of sensor 3. More particularly there is shown sensor unit assembly 5 having a reflective sensor 20 and a co-operating cylindrical reflective mirror 21*a* mounted on a passageway member 18. Pests drop out of a suitably connected known pest trap, due to gravity; along typical path 19*a* through diverter 10 mounted within male adapter 14 directing the falling pest into and through sensor 3 and finally into catch can 7. Diverter 10 positions the falling pest such that it passes between said cylindrical reflective sensor 20 and said co-operating cylindrical reflective mirror 21*a*. Also shown of said sensor unit assembly 5 are a co-operatively dimensioned male adapter 14, having a co-operatively connecting first end and a co-operatively connecting second end. Said male adapter 14 first end co-operatively connecting with said female end of said throat 9, and further co-operatively connecting to upper integral fitting 15 by means of said male adapter 14 second female end through passageway member 18. Fixedly mounted integral upper fitting 15 having a first end exposed outside a side of said gang box 16 and a second end exposed inside said gang box 16; further said lower integral fitting 23 having cooperatively sized female end and female adapter 24 having co-operatively sized female end exposed outside of the gang box 16. Further shown is mesh screen assembly 4 comprising a funnel/reducer 8 having a wider diameter end adaptable to the output of a pest trap; a narrower co-operatively sized end adaptable to connecting to said sensor unit assembly 5 by means of a co-operatively dimensioned throat 9 having male first end and a female second end; and having a mesh screen 11 mounted within the funnel throat 8*a*, said mesh screen 11 being locked in position by said male end of said throat 9; and catch can 7 having a first male end connecting to gang box 16 through passageway member 18.

Figure 5B:
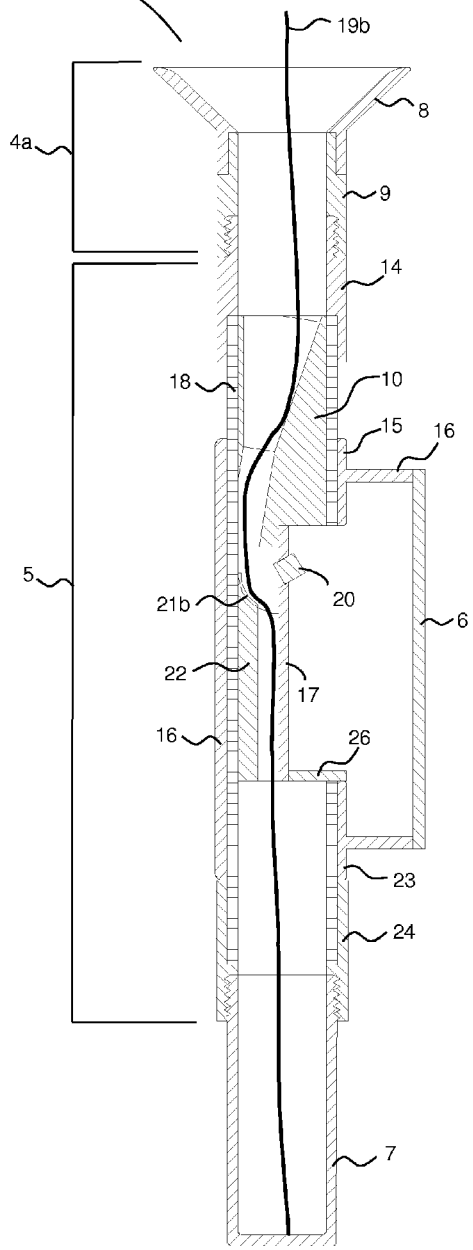
FIG. 5B shows a side sectional view of the spherical concave reflector of the present invention as well as the path of entering pests.

Turning to FIG. 5B, there is shown a cross-sectional view of sensor 3. More particularly there is shown sensor unit assembly 5 having a reflective sensor 20 and a co-operating concave spherical reflective mirror 21*b* mounted on a spherical mirror forming cradle 22. Bracket 17 supports spherical reflective sensor 20. Pests drop out of a suitably connected known pest trap, due to gravity, along typical path 19*b* through diverter 10 mounted within male adapter 14 directing the falling pest into and through sensor 3 and finally into catch can 7. Diverter 10 positions the falling pest such that it passes between said reflective sensor 20 and said co-operating spherical reflective mirror 21*b*. Also shown of said sensor unit assembly 5 are a co-operatively dimensioned male adapter 14, having a first male end and a second female end. Said male adapter 14 male first end co-operatively connecting to said female end of said throat 9, and further cooperatively connecting to upper integral fitting 15 by means of said male adapter 14 second female end through passageway member 18. Fixedly mounted integral upper fitting 15 having a first end exposed outside a side of said gang box 16 and a second end exposed inside said gang box 16; further said lower integral fitting 23 having co-operatively sized female end and integral female adapter 24 having co-operatively sized female end exposed outside of the gang box 16. Further shown is mesh screen assembly 4 comprising a funnel/reducer 8 having a wider diameter end adaptable to the output of a pest trap; a narrower co-operatively sized female end adaptable to connecting to said sensor unit assembly 5 by means of a co-operatively dimensioned throat 9 having a first male end and a second female end; and having a mesh screen 11 mounted within the funnel throat 8*a*, said mesh screen 11 being locked in position by said male end of said throat 9; and catch can 7 having a first male end connecting to gang box 16 through passageway member 18.

Figure 6A:
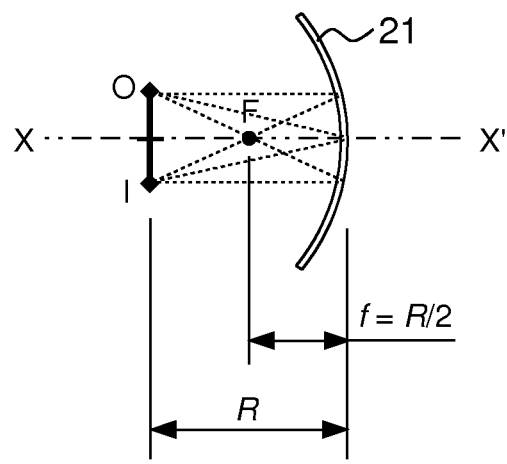
FIG. 6A shows a schematic view of the concave reflector position relative to the reflector sensor in the present invention.

FIG. 6A shows the preferred concave mirror 21 geometry wherein said concave mirror 21 has a focal length $f=R/2$. The spacing between the reflective sensor 20 (see FIG. 6B) and the concave mirror 21 is equal to the radius R of said mirror 21 producing an image on said reflective sensor 20 (see FIG. 6B) such that object O and image I have equal size and opposite orientation.

Figure 6B:
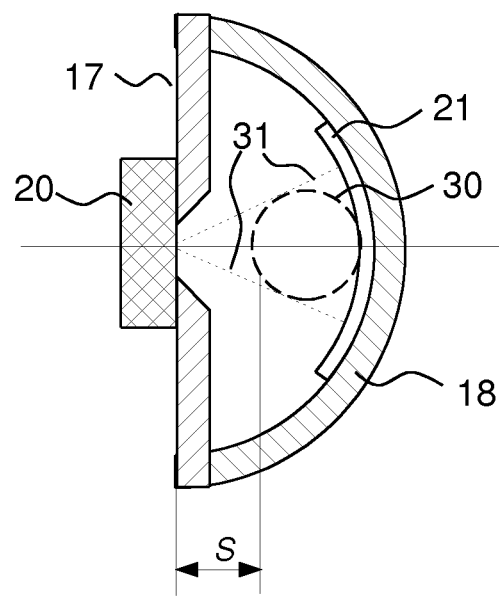
FIG. 6B shows a cross-section plan view of the concave reflector mounted in the present invention.

FIG. 6B shows top cross section view of the reflective sensor 20 mounted on mount plate 17 and concave mirror 21 mounted on the suitable co-operating passageway member 18, and further showing the required reflective sensor 20 beam range limits 31, span the possible pest falling paths 19 (see FIGS. 5*a* and 5*b*). It is to be understood that the reflective sensor 20 and the concave mirror 21 are selected to provide a beam range 31 that spans the range 30 of possible falling pest paths 19.

Figure 7:
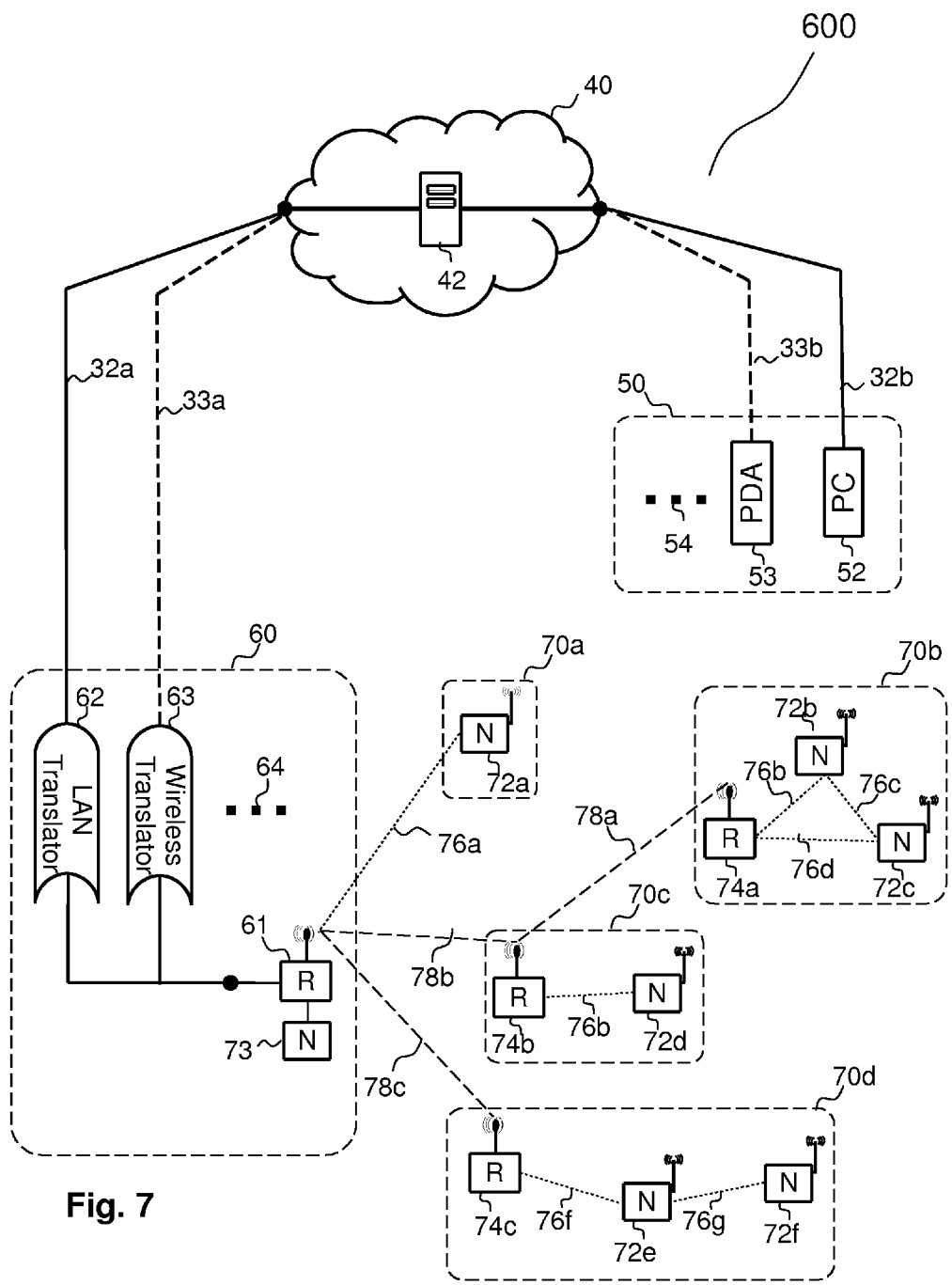
FIG. 7 shows a schematic view of a network comprising a plurality of pest trap sensors of the present invention.

Finally, turning to FIG. 7 there is shown pest monitoring network 600 utilizing a plurality of presently claimed sensors 3. One or more of said sensors 3 forming clusters 70*a*-70*d*. Cluster 70*a*, for example, illustrating a node 72*a* comprising a single pest trap 1 or 2 and sensor 3, at short range, wirelessly connected to a gateway device 60 by means of wireless connection 76*a* to gateway interface 61. Similarly cluster 70*c* illustrates note 72*d* comprising a single pest trap 1 or 2 and sensor 3, at longer range wirelessly 76*b* connected to a router 74*b*, said router 74*b* wirelessly connected to gateway device 60 by means of wireless connection 78*b*. Likewise, cluster 70*b* illustrates multiple nodes 72*b* and 72*c*, each comprising pest trap 1 or 2 and sensor 3, connected wirelessly in parallel by wireless connections 76*b*-76*d* to a router 74*a*. Router 74*a* is wirelessly connected to router 74*b* by means of wireless connection 78*a* and then to gateway interface 61 over wireless connection 78*b*. Further there is illustrated multiple nodes 72*e* and 72*f*, each comprising pest trap 1 or 2 and sensor 3, connected wirelessly in series by wireless connections 76*f*-76*g* to a gateway interface 61 over wireless connection 78*c*. Finally, node 73 having a trap 1 or 2 and sensor 3 connected by wire directly to said gateway interface 61.

Gateway 61 is electrically connected to a wired LAN 62, wireless WLAN 63 or other suitable translator and protocol 64 by means of wired connection 32*a* or wireless connection 33*a* to server 42 within a cloud 40. Said server 42 within said cloud 40 accessible, by a user, by means of client cluster 50 comprising one or more of PC 52, PDA 53, or other device 54, such as for example, a smart phone or pad computer.

In its broadest form the claimed invention comprises an improved beam-interruption type pest detection sensor assembly suitable for use with known pest traps in which pests are deflected downward and fall by gravity comprising in cooperative combination: a mesh screen assembly comprising; a funnel having a wider diameter first end connectable to the output end of a pest trap, a narrower second end adaptable to connecting to a sensor assembly, and having a fixedly mounted mesh screen therein and mountable on; a sensor assembly comprising; a focused reflective concave mirror sensor fixedly mounted within a co-operatively dimensioned sensor container, said focused reflective concave mirror sensor comprising a mounting plate, a concave mirror forming cradle having a concave mirror and a reflective sensor wherein said concave mirror having a focal length $f=R/2$, the spacing between said reflective sensor and said focused reflective concave mirror is equal to the radius of said mirror producing an image having equal size and opposite orientation on said reflective sensor; and a catch can assembly comprising; a co-operatively dimensioned trapping container having a first end mountable to the exit of said sensor assembly, a second end sealed thereby forming a collection container; thereby creating a beam—interruption pest sensor using focused reflective concave mirror sensor having improved sensitivity, improved sensing consistency, lower energy consumption, and adaptable to mounting on pest traps in which pests are deflected downward and then fall by gravity.

In practice the transmission of pest data to said server 42 within said cloud 40 happens on a desired periodic basis, for example every 24 hours or whenever interrogated by a device within said client cluster 50. The server 42 processes the pest data, included but not limited to, arrival time of each pest. The server 42 then notifies the devices 52-54 in the client cluster 50 when the computer 42 has detected such pest data. Further, devices 52-54 within the client cluster 50 may query for any received data.

Suitable optical sensors, reflective mirror materials, and housing construction materials are well known in the art. A presently preferred optical sensor for use in the present invention is Vishay CNY70. Presently preferred reflective materials are Nashua Type 32 General Purpose Foil Tape, supplied by Berry Plastic Corporation. Presently preferred materials for construction of the sensor housing assembly, the trap assembly, and the funnel assembly are PVC and ABS. It is to be understood that other materials such as, for example, metal, engineered materials, and the like may be used for the housing.

Suitable means of co-operative connection include, for example, threaded connections, bayonet connections, and pressure fit connections. Presently preferred are threaded connections comprising compatible male and female threaded mating ends.

Thus, the present invention provides clogging risk mitigation by providing a built-in mesh screen 11 to filter out large objects which could clog the sensing passageway. The use of focused reflective optics allows a sensing zone to be oversized relative to the pitch of the mesh screen, thereby minimizing clogging risk by beetles that tumble while falling so as to present their small dimension to the mesh and their large dimension to the passageway.

The focused reflective optics promote increased sensitivity, and sensing consistency because a concave mirror gathers, reflects and concentrates emitted radiation and the shadow cast by a falling pest towards the sensing element. Optical concentration depends on concave mirror geometry. The spherical concave mirror (21b in FIG. 4b) concentrates the emitted radiation and the pest shadow in two dimensions and prevents more sensitivity loss than the cylindrical concave mirror 21 (see FIG. 4a) which concentrates in one dimension.

The focused reflective optics promotes sensing consistency because the setback S inherent to the optics increases the consistency of the shadows cast upon the sensing element by falling pests; see FIG. 6B. Shadows cast upon the sensing element become more consistent in size because the setback S reduces the variation of separation between the emitter and pest within the range 30 of possible falling pest paths 19, relative to the mean separation. Reduced shadow size variation produces improved sensing consistency.

One particularly preferred embodiment of the present invention provides for an improved beam-interruption type pest detection sensor assembly suitable for use with known pest traps comprising in cooperative combination: a mesh screen assembly comprising; a funnel having a wider diameter first end adaptable to the output of a pest trap, a narrower second end adaptable to connecting to a first adapter capable of mounting to a sensor assembly, and having a mesh screen mounted within, said mesh screen being locked in position by said first adapter; a sensor assembly comprising; a cooperatively dimensioned threaded second adapter having a first end with male threads and a second end with female threads. Said second adapter male threaded first end cooperatively connecting with said female threaded end of said threaded first adapter and further co-operatively connecting to a box assembly gang box passageway member connects the first adapter and the integral upper fitting by a fixedly mounted integral upper fitting having a first end exposed outside a side of said gang box, said upper fitting further having a second end exposed inside said gang box and an integral pest diverter of a desired geometry fixedly mounted therein, said gang box being sized desirably for housing the sensor components and has fixedly mounted on the opposite side of said gang box a fixedly mounted integral lower fitting, and a removably mountable gang box cover. The integral lower fitting having co-operatively sized end exposed outside of said gang box co-operatively connecting said integral lower fitting to a third adapter having a first end co-operatively sized and having a second end having co-operatively sized female threads for removably mounting a catch can, sensor components comprising a mount plate, a concave mirror forming cradle having a mirror and a reflective sensor wherein said concave mirror has a focal length $f=R/2$, the spacing between said reflective sensor and said concave mirror is equal to the radius of said mirror producing an image on said reflective sensor such that object and image have equal size and opposite orientation, and an external radio antenna; a catch can assembly comprising; a co-operatively dimensioned threaded first end with male threads connecting to said threaded third adapter and a second end sealed thereby forming a collection container; hereby creating a beam-interruption pest sensor having improved sensitivity and lower energy consumption and adaptable to mounting on know pest traps.

Another particularly preferred embodiment of the present invention provides an improved beam-interruption type pest detection sensor assembly suitable for use with known pest traps comprising in cooperative combination: a mesh screen assembly comprising; a funnel having a wider diameter first end adaptable to the output of a pest trap, a narrower second end adaptable to connecting to a first adapter capable of mounting to a sensor assembly, and having a mesh screen mounted within, said mesh screen being locked in position by said first adapter; a sensor assembly comprising; a cooperatively dimensioned fixedly mounted integral upper fitting having a first end exposed outside a side of said gang box, said upper fitting further having a second end exposed inside said gang box and an integral pest diverter of a desired geometry fixedly mounted therein, said gang box being sized desirably for housing the sensor components and has fixedly mounted on the opposite side of said gang box a fixedly mounted integral lower fitting, and a removably mountable gang box cover. The integral lower fitting co-operatively dimensioned in the end exposed outside of said gang box connecting said integral lower fitting to a catch can, sensor components comprising a mount plate, a concave mirror forming cradle having a mirror and a reflective sensor wherein said concave mirror has a focal length f=R/2, the spacing between said reflective sensor and said concave mirror is equal to the radius of said mirror producing an image on said reflective sensor such that object and image have equal size and opposite orientation, and an external radio antenna; a catch can assembly comprising; a co-operatively dimensioned threaded first end with male threads connecting to said integral lower fitting and a second end sealed thereby creating a beam-interruption pest sensor using focused reflective concave mirror sensor having improved sensitivity, improved sensing consistency, reduced clogging risk, reduced energy consumption, and adaptable to mounting on pest traps in which pests are deflected downward and then fall by gravity.

A further preferred embodiment of the present invention provides a pest monitoring network utilizing a plurality of sensors having, one or more of said plurality of sensors forming a plurality of nodes electronically connected to a gateway device, said gateway device electronically connected to a cloud server accessible to a plurality of user interface devices, thereby allowing processing and management of data collected by said plurality of sensors.

Although the preferred embodiments of the present invention has been disclosed, various changes and modifications may be made without departing from the scope of the invention as set forth in the appended claims.

What is claimed is:

1. An improved beam-interruption type pest detection sensor assembly suitable for use with known pest traps in which pests are deflected downward and fall by gravity comprising in cooperative combination:
   a) a mesh screen assembly comprising; a funnel having a wider diameter first end connectable to the output end of a pest trap, a narrower second end adaptable to connecting to a sensor assembly, and having a fixedly mounted mesh screen therein and mountable on;
   b) a sensor assembly comprising; a focused reflective concave mirror sensor fixedly mounted within a co-operatively dimensioned sensor container, said focused reflective concave mirror sensor comprising a mounting plate, a concave mirror forming cradle having a concave mirror and a reflective sensor wherein said concave mirror having a focal length f=R/2, the spacing between said reflective sensor and said focused reflective concave mirror is equal to the radius R of said mirror producing an image having equal size and opposite orientation on said reflective sensor; and
   c) a catch can assembly comprising; a co-operatively dimensioned trapping container having a first end mountable to the exit of said sensor assembly, a second end sealed thereby forming a collection container;
   thereby creating a beam-interruption pest sensor using focused reflective concave mirror sensor having improved sensitivity, improved sensing consistency, reduced clogging risk, reduced energy consumption, and adaptable to mounting on pest traps in which pests are deflected downward and then fall by gravity.

2. The improved beam-interruption type pest detection sensor assembly as claimed in claim 1 wherein, said concave mirror is a cylindrical concave mirror.

3. The improved beam-interruption type pest detection sensor assembly as claimed in claim 1 wherein, said concave mirror is a spherical concave mirror.

4. The improved beam-interruption type pest detection sensor assembly as claimed in claim 1 wherein, said mesh screen assembly has a horizontal mesh sized to prevent debris clogging in low debris areas.

5. The improved beam-interruption type pest detection sensor assembly as claimed in claim 1 wherein, said mesh screen assembly has a mesh sized to prevent debris clogging in high debris areas and further is mounted at a desired angle to allow said debris to exit the mesh screen assembly through an opening in the sidewall of said funnel.

6. The mesh screen assembly as claimed in claim 5 wherein, said desired screen angle is from about 40 degrees to about 50 degrees.

7. The improved beam-interruption type pest detection sensor assembly as claimed in claim 1 wherein, said mesh screen assembly mountable to the exit end of a Lindgren pest trap.

8. The improved beam-interruption type pest detection sensor assembly as claimed in claim 1 wherein, said mesh screen assembly mountable to the exit end of an Armstrong et al pest trap.

9. The improved beam-interruption type pest detection sensor assembly as claimed in claim 1 wherein, said concave mirror comprises reflective tape.

10. The improved beam-interruption type pest detection sensor assembly as claimed in claim 1 wherein, said sensor assembly unit, and said catch can assembly comprises PVC pipe, conduit and fittings using threaded connections between said screen assembly, said sensor assembly unit, and said catch can assembly.

11. The improved beam-interruption type pest detection sensor assembly as claimed in claim 1 wherein, said screen assembly comprises ABS pipe and fittings using threaded connections between said screen assembly, said sensor assembly unit assembly.

12. The improved beam-interruption type pest detection sensor assembly as claimed in claim 1 wherein, said catch can assembly further comprises a suitably located and dimensioned decanting port for allowing decanting of moisture, said decanting port having a mesh screen preventing escape of trapped pests through said decanting port.

13. The improved beam-interruption type pest detection sensor assembly as claimed in claim 1 wherein, said cooperative combination comprises cooperative threaded ends on said assemblies.

14. The improved beam-interruption type pest detection sensor assembly as claimed in claim 1 wherein, said cooperative combination comprises cooperative bayonet ends on said assemblies.

15. The improved beam-interruption type pest detection sensor assembly as claimed in claim 1 wherein, said cooperative combination comprises cooperative pressure fit ends on said assemblies.

16. The improved beam-interruption type pest detection sensor assembly as claimed in claim 1 wherein, said sensor assembly further includes an antenna for increasing signal range.

17. A pest monitoring network utilizing a plurality of sensors as claimed in claim 1 having, at least one of said plurality of sensors forming a plurality of nodes electronically connected to a gateway device, said gateway device electronically connected to a cloud server accessible to a plurality of cloud-connected user interface devices, thereby allowing visibility, processing and management of data collected by said plurality of sensors.

18. A pest monitoring network as claimed in claim 15 wherein, said nodes are selected from the group comprising wired nodes, wireless nodes, and combinations thereof.

19. A pest monitoring network as claimed in claim 15 wherein, said user interface devices are selected from the group comprising desktop computers, laptop computers, pad computers, smart phones, net books, and combinations thereof.

\* \* \* \* \*